(12) United States Patent
Imus et al.

(10) Patent No.: US 7,404,464 B2
(45) Date of Patent: Jul. 29, 2008

(54) VACUUM TRACTION DEVICE

(75) Inventors: Richard L. Imus, Seattle, WA (US); Marc S. Imus, Seattle, WA (US); Paul A. Mittmann, Seattle, WA (US); John L. Mittmann, Seattle, WA (US)

(73) Assignee: Mobile Robot Integration, Inc., Seattle, WA (US)

( * ) Notice: Subject to any disclaimer, the term of this patent is extended or adjusted under 35 U.S.C. 154(b) by 302 days.

(21) Appl. No.: 11/331,884

(22) Filed: Jan. 13, 2006

(65) Prior Publication Data

US 2007/0163827 A1    Jul. 19, 2007

(51) Int. Cl.
*B60B 39/00* (2006.01)
(52) U.S. Cl. ........................................ 180/164
(58) Field of Classification Search .................. 180/164
See application file for complete search history.

(56) References Cited

U.S. PATENT DOCUMENTS

| | | | |
|---|---|---|---|
| 6,102,145 A * | 8/2000 | Fisher | 180/164 |
| 6,742,617 B2 | 6/2004 | Jeswine et al. | |
| 6,964,312 B2 * | 11/2005 | Maggio | 180/164 |
| 2005/0072612 A1 * | 4/2005 | Maggio | 180/164 |
| 2006/0278454 A1 * | 12/2006 | Maggio | 180/164 |

* cited by examiner

*Primary Examiner*—Lesley D. Morris
*Assistant Examiner*—Michael R Stabley
(74) *Attorney, Agent, or Firm*—Dorsey & Whitney LLP; Brian J. Laurenzo; Jason M. Hunt

(57) ABSTRACT

A traction device includes a continuous traction belt provided on a pair of opposing rollers. The traction belt includes openings such that a vacuum may be applied through the traction belt causing the traction device to cling to a working surface. A motor may be provided to drive one of the rollers and thereby drive the belt. A plurality of such traction devices may be coupled with a control mechanism to form a robot. A system is described for performing work or maintenance on a structure having an inclined working surface that includes a support robot for positioning at a high point on the structure and a payload robot attached to the support robot by an umbilical or tension cord for maneuvering along the working surface.

8 Claims, 11 Drawing Sheets

VACUUM TRACTION DEVICE

FIELD OF INVENTION

This invention relates to traction devices for adhering and moving tools across vertical, inverted, inclined, curved, compound, and tapered surfaces.

BACKGROUND OF THE INVENTION

It is often desirable to hold a tool in close proximity to a vertical, inverted, inclined surface, curved, compound, or tapered surface and to move the tool to various locations on the surface. Some common scenarios include inspecting, cleaning, depainting, or otherwise maintaining the surfaces of airplanes, submarines, storage tanks, high rise buildings, and other similar structures. These surfaces can be inconvenient, difficult or even dangerous, for people to access directly. The difficulty can be increased when these surfaces are curved, compound, or tapered. Accordingly, it has been known to use an apparatus capable of traversing such surfaces and for supporting tools to work on the surfaces. For example, Jeswine, U.S. Pat. No. 6,742,617, discloses a surface clinging unit that includes a plurality of adherence members, in the form of suction cups that are used to adhere to a surface and a safety tether between two robots.

Therefore there is a need for an improved traction device, and especially for a vehicle or robot that utilizes such an improved traction device to cling to and move around on vertical, inverted, or inclined surfaces, and especially on surfaces that are curved, compound, or tapered.

SUMMARY OF THE INVENTION

According to one embodiment the present invention is a traction device including a continuous traction belt mounted on a pair of opposing rollers. The belt forms a continuous loop around the rollers such that a traction portion is formed by one span of the continuous belt between the rollers. A manifold is mounted in close proximity to an inner surface of the traction portion, and a vacuum source is connected to the manifold for supplying vacuum to the inner surface of the traction portion. The traction belt is provided with apertures extending through the belt from the inner surface to the traction surface. The frame may include a tensioning member to adjust the distance between the rollers and thereby adjust the tension in the belt. A motor may be provided to drive one or both of the rollers, and thereby drive the belt. A mechanism may be provided to selectively supply positive pressure through the manifold. One or more of such traction devices may be coupled with a support on which a tool may be mounted.

According to another embodiment the present invention is a multiple robot system for performing work on compound curved and tapered surfaces as well as inclined, vertical and inverted surfaces. A support robot is suitable for positioning at a high point on or near the surface to be worked upon. A tension element such as an umbilical or cord is attached to the support robot and extends downwardly along the surface to be worked on. A payload robot is attached to the tension umbilical or cord, thereby transferring part of the weight of the payload robot to the support robot. The payload robot is provided with at least one traction device to permit the payload robot to cling to and maneuver along the surface. The support robot may be provided with software permitting the control and navigation of the payload robot. A second, or additional, payload robot may be attached to the support robot by a second tension element.

The features, utilities, and advantages of various embodiments of the invention will be apparent from the following more particular description of the embodiments as illustrated in the accompanying drawings and find in the appended claims.

DETAILED DESCRIPTION OF PREFERRED EMBODIMENTS

Figure 1:
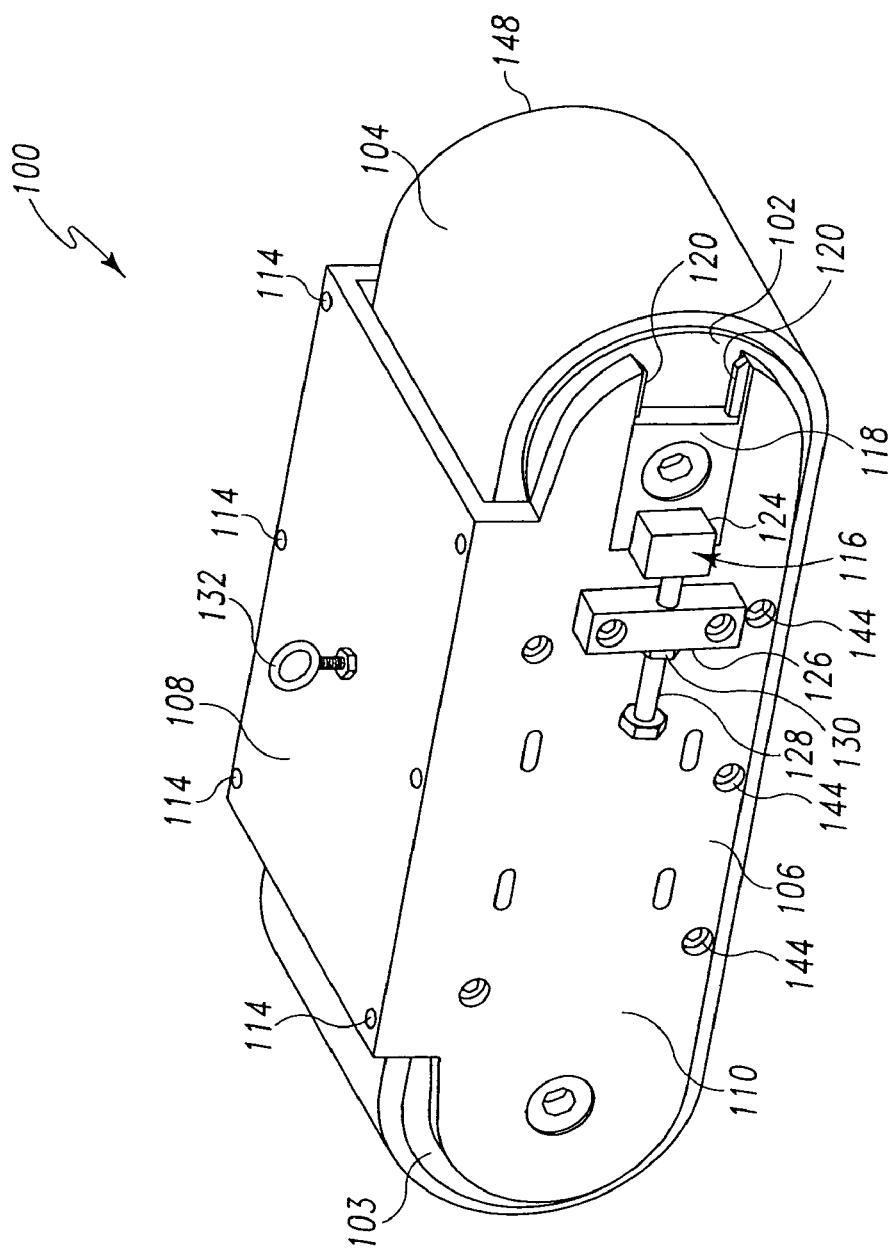
FIG. 1 is an isometric view of a traction device according to one embodiment of the present invention.
Figure 2:
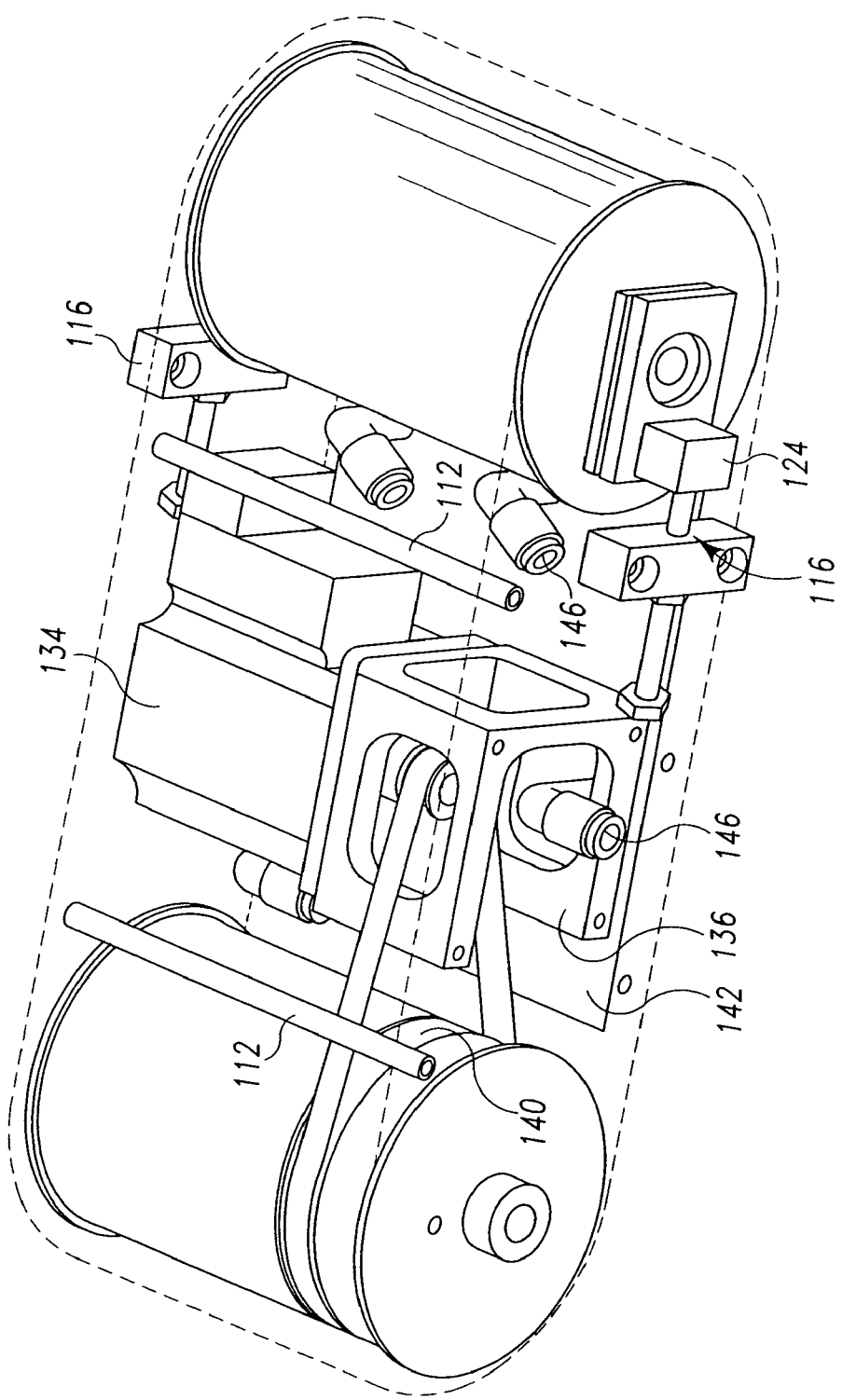
FIG. 2 is a partial fragmentary view of the traction device of FIG. 1.
Figure 3:
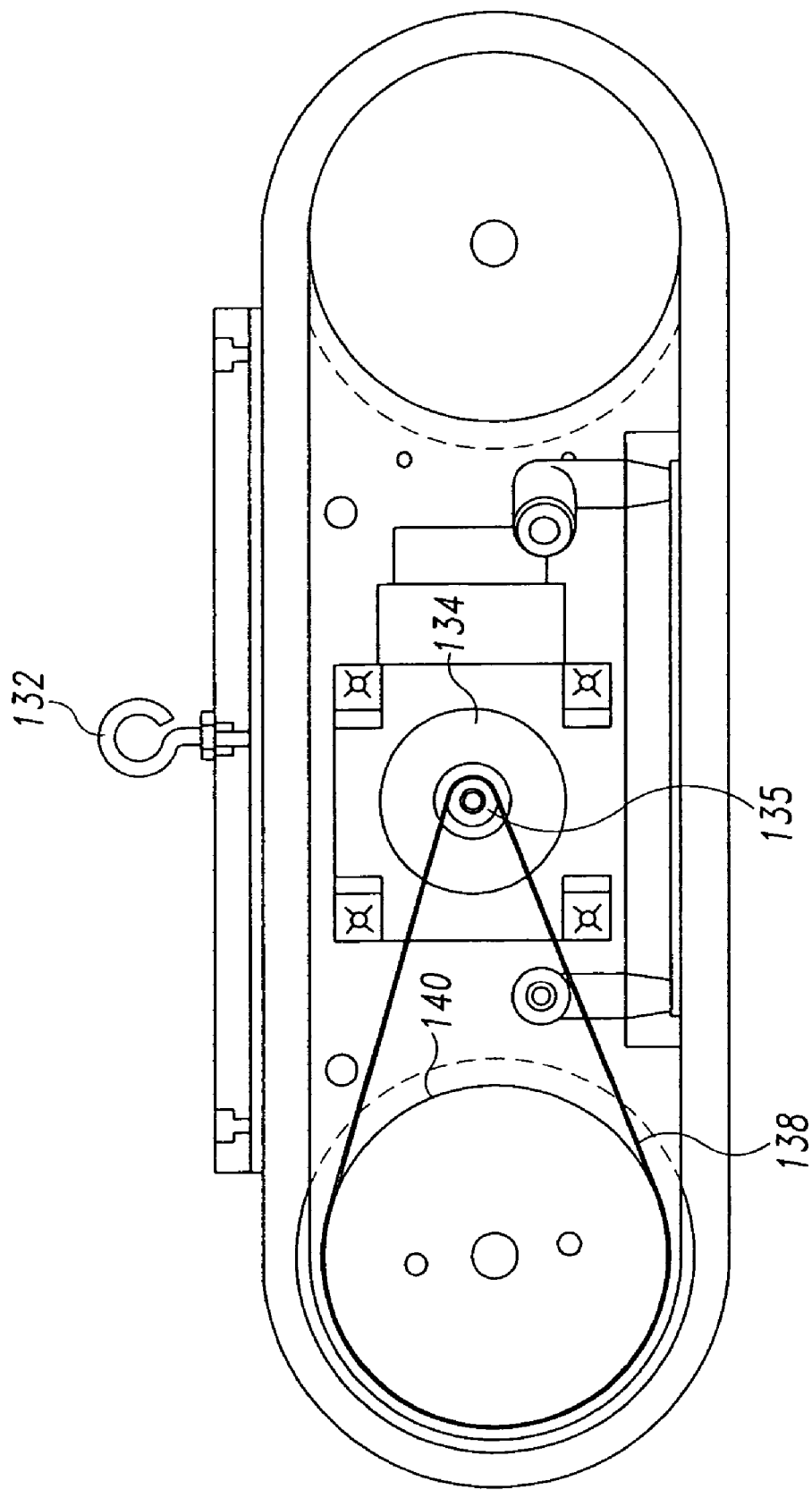
FIG. 3 is a cross-section of the view of the traction device of FIG. 1 taken along line 3-3 of FIG. 1.

A traction device 100 is shown in FIG. 1. As will be discussed in more detail, this traction device 100 is useful for clinging to and maneuvering on inclined, inverted, and vertical surfaces that are difficult to access directly. The traction device 100 includes a first roller 102 and a second roller 103 that support a continuous traction belt 104. The rollers 102 and 103 are mounted on a frame 106. In the embodiment of FIGS. 1-3, the frame 106 includes top plate 108 and side plate 110. Support braces 112 are provided internally to help reinforce frame 106. The frame 106 serves as a support and scaffold for the rollers 102 and 103, and additional components of the traction device 100. Bolts 114 are used to securely fasten the top plate 108 to the side plates 110, and to fasten the braces 112 to the side plates 110. The exact configuration and components used for the frame 106 are not crucial.

A tensioning mechanism 116 is provided in association with the first roller 102. The tensioning mechanism 116 allows the spacing between the rollers 102 and 103 to be adjusted in order to maintain the traction belt 104 at a desired tension. During operation, the tension within the belt 104 should be sufficient to maintain it in place on the rollers 102 and 103, but should not be so tight as to restrict the rotation of the rollers 102 and 103 or to prevent some flexing of the traction belt 104.

The tensioning mechanism 116 includes a slidable bushing 118 provided with grooves that engage tongues 120 formed in side plate 110. The bushing 118 supports an axle 122 of the first roller 102. The slidable bushing 118 is slidable along the tongues 120 to adjust the distance between the first roller 102 and the second roller 103. A bearing 124 is secured to an outer surface of the slidable bushing 118. Shoulder 126 is fixed to the outside of side plate 110, and a threaded adjustment member 128 passes through an aperture in the shoulder 126 such that it is in alignment with and bearing engagement against the bearing 124. A threaded receiver 130, such as a nut, is fixed to the shoulder 126. The threaded adjustment member 128 can be adjusted relative to the shoulder 126 by axially turning the threaded adjustment member 128, as for example with a socket wrench. The threaded adjustment member 128 can thereby urge the bearing 124 and first roller 102 away from the second roller 103 in order to hold the traction belt 104 at the desired tension. Again, those of skill in the art will be aware of additional mechanisms for urging the first and second rollers 102 and 103 apart from each other to maintain the traction belt 104 at a desired tension.

An attachment point in the form of an eye bolt 132 is provided on the top plate 108. The eye bolt 132 serves as a connection point for attaching the traction device 100 to a vehicle suspension, robot, tool, or the like. Depending upon the circumstance, those of skill in the art will be aware of attachment mechanisms other than an eye bolt, including attachment points located on parts of the frame 106 other than the top plate 108.

Various components are mounted inside the frame 106 as best seen in FIGS. 2 and 3. A motor 134 is mounted to an inside surface of a side plate 110. A motor mount 136, attached to the inside of the opposite side plate 110 securely fastens the motor 134 to the frame 106. The motor 134 has an output shaft 135 that is engaged by drive belt 138. The second roller 103 includes a driven surface 140 in the form of a recessed groove within the outer surface of the second roller 103. Therefore, as the output shaft 135 is rotated by the motor 134 the drive belt 138 correspondingly drives the second roller 103. As shown, the drive belt 138 frictionally engages both the drive shift 135 and the driven surface 140 of the roller 103. It should be appreciated that the drive belt 138 could be provided with teeth that engage corresponding spur gears, or similar arrangements, to provide a more positive drive. Similarly, while the traction belt 104 is shown frictionally engaging the driven roller 103, alternative structures could be used to provide a more positive drive of the traction belt 104. It should be further appreciated that a second motor could be used so that both rollers 102 and 103 are driven. Furthermore an additional roller or rollers could be added, and in particular a tensioning roller could be utilized.

Figure 4:
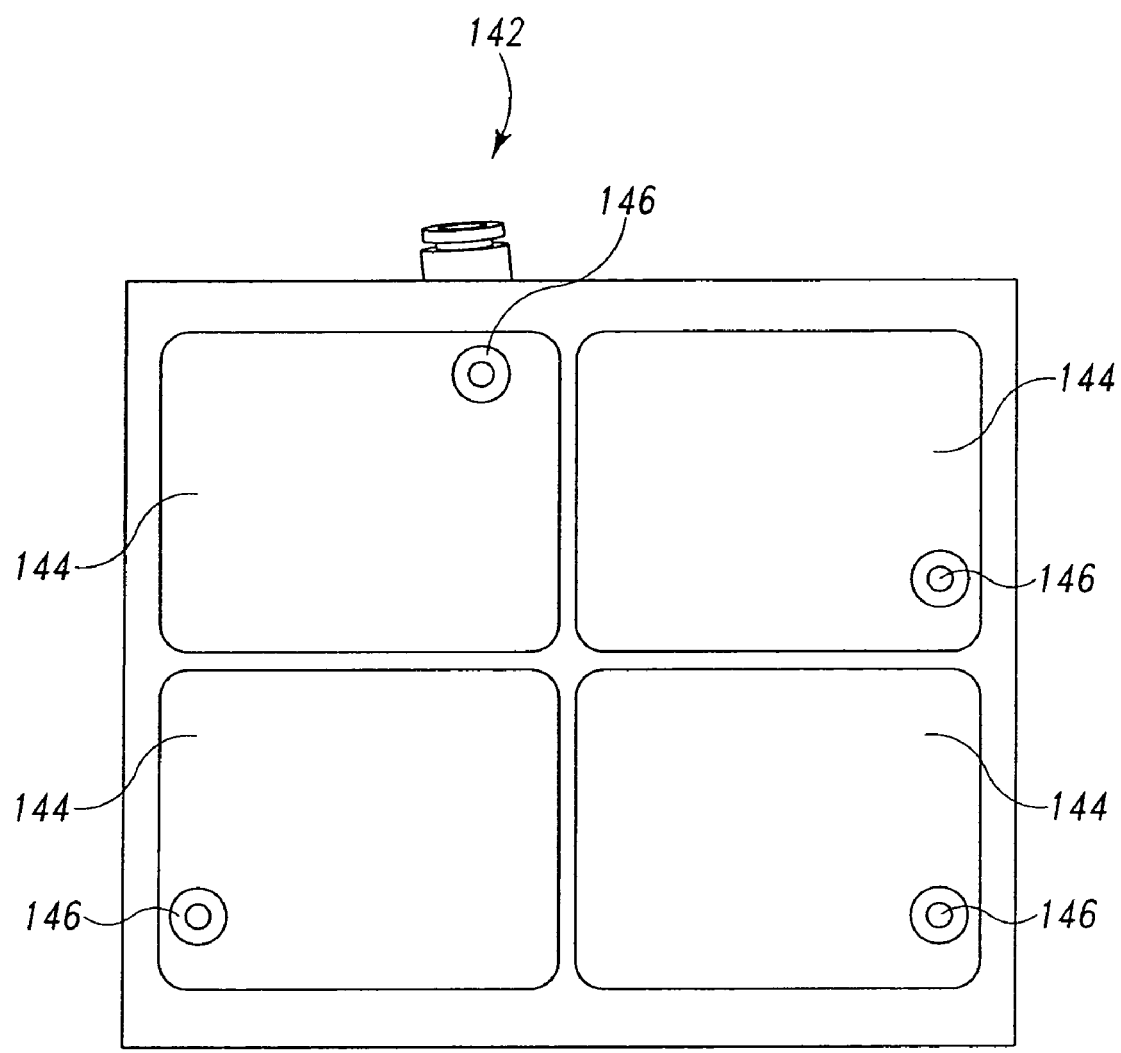
FIG. 4 is a bottom view of the manifold of the embodiment shown in FIG. 1.

A manifold plate 142 is mounted to the bottom of the frame 106 between side plates 110. In the embodiment shown, the manifold plate 142 is mounted by manifold bolts 145. It could be attached by other conventional means, such as welding or the like. The manifold plate 142 is provided with at least one downwardly facing recessed portion 144. The embodiment shown, as best seen in FIG. 4, the manifold plate 142 includes four such downwardly facing recessed portions 144. Each recessed portion 144 is provided with an outlet in the form of elbow 146. A remote vacuum source (not shown) may be connected to the elbows 146 in order to supply a vacuum, or reduced pressure through the elbows 146 to the recessed portions 144 on the bottom side of the manifold plate 142. The inside surface of the traction belt 104 thereby has a vacuum, or negative relative pressure applied along the portion where it slides across in close contact with the bottom of the manifold plate 142. The manifold plate 142 may be formed as a relatively rigid plate, as for example cast aluminum. Alternatively, the manifold plate 142 could be made to allow some flex in order to permit the traction device 100 to better cling to curved or compound surfaces. As a further alternative, the single manifold plate 142 could be replaced by a plurality of plates or suction cups each having its own recessed portion, and further that the individual plates or cups could be articulated so that they match the contour of the surface on which the device 100 is being used.

The traction belt 104 is preferably formed from a flexible durable material. Ideally the outward facing surface will be relatively tacky, or have a high coefficient of friction, but will not mar or scratch metal or painted surfaces. Preferably the inward facing surface of the traction belt 104 will be smooth and have a low coefficient of friction so that it will slide easily across the manifold plate 142. Importantly, the traction belt 104 is provided with openings 148 in the form of slots, holes, slits, or other type of apertures. These openings 148 provide a passage way to permit the vacuum applied to the inside surface of the traction belt 104 to be applied through the traction belt 104 to the outward facing surface of the traction belt 104. The outer surface of the belt 104 forms a tread or traction portion between the rollers 102 and 103 that is suitable for engaging and riding on a working surface.

Figure 5:
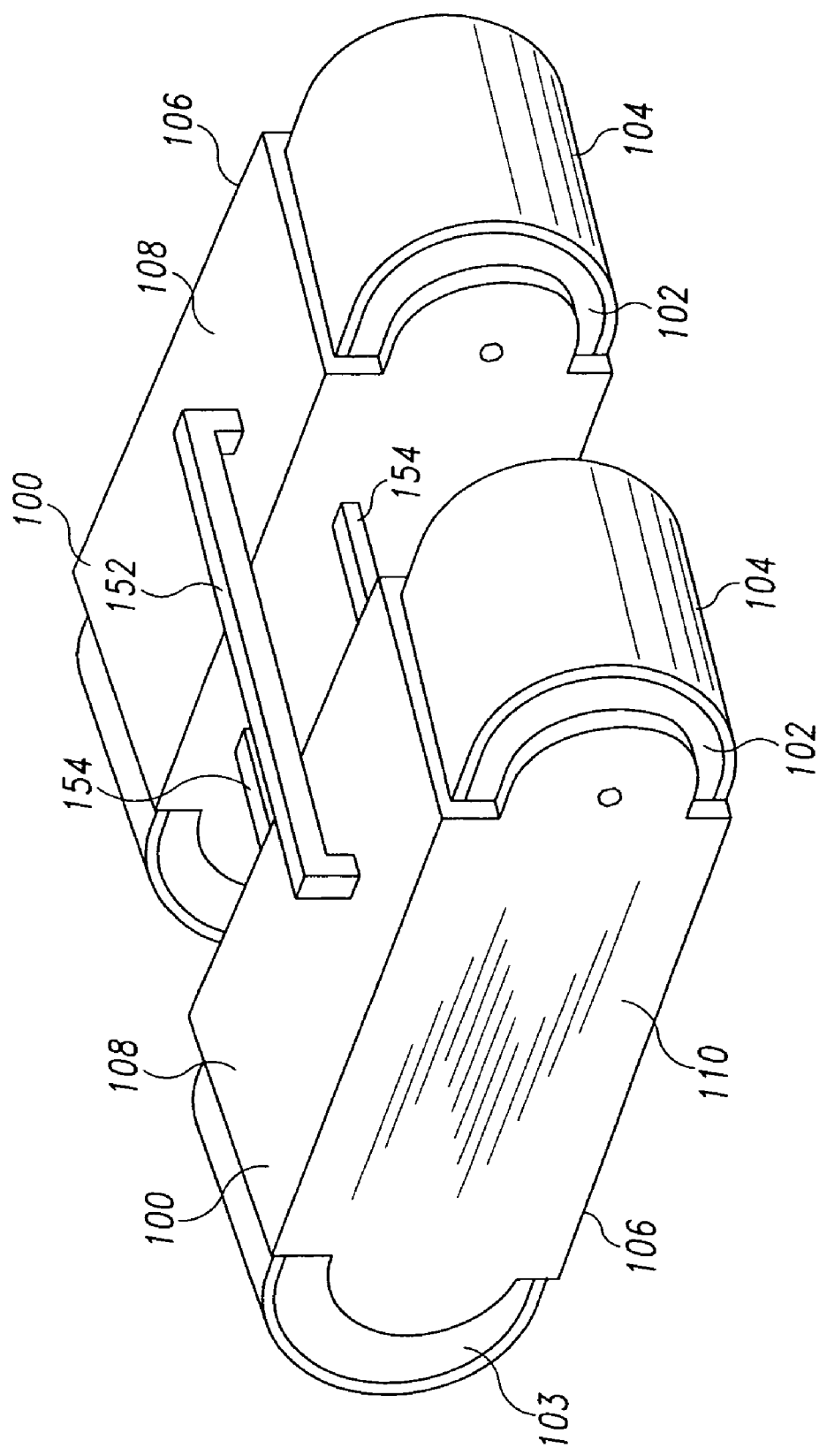
FIG. 5 is an isometric view of a surface clinging device according to one embodiment of the present invention.
Figure 6:
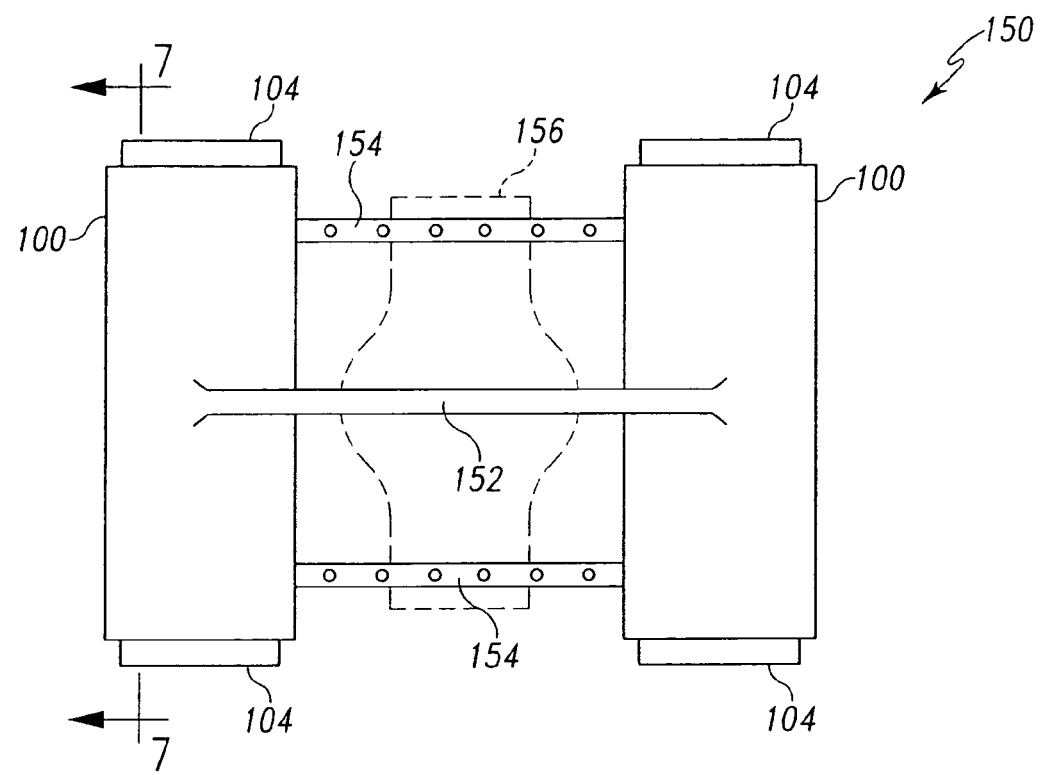
FIG. 6 is a top plan view of the surface clinging device shown in FIG. 5.

FIGS. 5-7 show a surface clinging tool 150 according one embodiment of the present invention. The surface clinging tool 150 includes a pair of traction devices 100 similar to the traction device 100 described above. Rather than having an eye bolt 132 attached to the top plate 108, each of the traction devices 100 is connected with a handle 152 that permits a user to manipulate the surface clinging tool 150. Additionally, tool mounting bars 154 are provided between the facing side plates 110 of the two traction devices 100. The surface clinging tool 150 may be used to help support a tool 156 (shown in broken lines in FIG. 6) in a working position against a inclined or downward facing surface. The tool may be a grinder, sander, polisher, painter, sensor, camera, or any other tool that needs to be held in close proximity to a working surface, and that may be difficult or heavy to maneuver without the aid of a surface clinging tool 150.

Figure 7A:
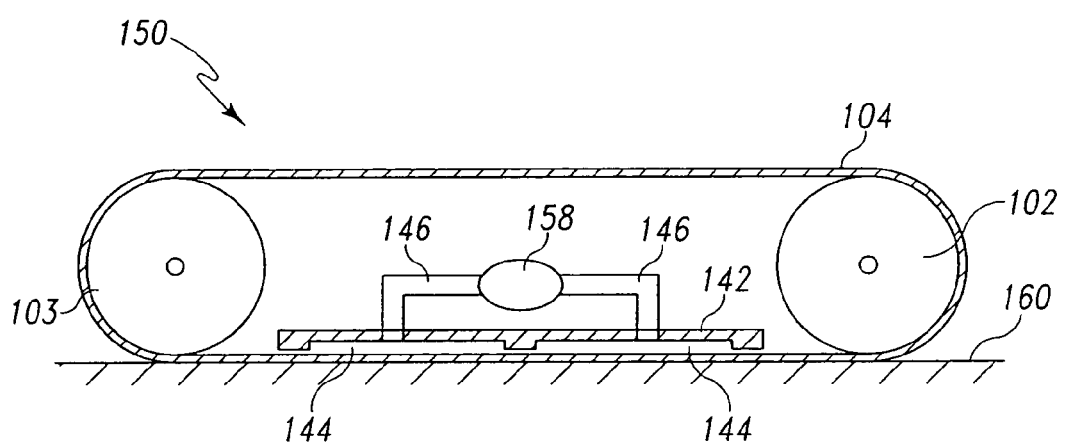
FIG. 7a is a cross-sectional view of the surface clinging device of FIG. 5 taken along line 7-7 of FIG. 6 with the vacuum source in a de-energized state.

FIG. 7(a) shows the surface clinging tool 150 in a non-energized state wherein a vacuum has not been applied through the manifold plate 142. It should be appreciated that in the embodiment shown, an internal vacuum source 158 is provided within each traction device 100 in order to supply the vacuum across the manifold plate 142, when desired. It should be appreciated, that the traction devices 100 may be provided with or without a motor to drive the traction belt 104. A power supply in the form of a battery, or more preferably an electric outlet, must be connected with the vacuum source 158. Furthermore, the vacuum source 158 may be replaced with a remote vacuum source that is attached to the elbows 146 by flexible hose (not shown). A control mechanism (not shown) should also be provided to permit a user to selectively turn on and off the vacuum supply 158. In the non-energized state of FIG. 7(a), the traction belt 104 will sit flat, or flush, against the working surface 160. In this state, the surface clinging tool 150 provides no support to hold the weight of the tool 156, but will still hold the tool 156 at a proper position relative to the working surface 160.

Figure 7B:
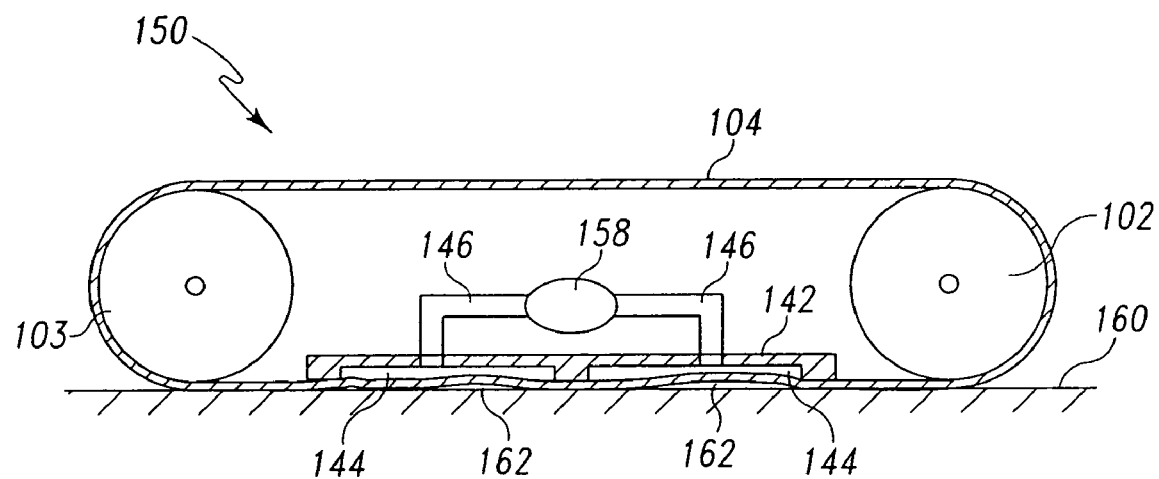
FIG. 7b is a cross-sectional view of the surface clinging device of FIG. 5 taken along line 7-7 of FIG. 6 with the vacuum source in an energized state.

When the vacuum supply 158 is activated, a negative relative pressure is provided through elbows 146 into the recessed portions 144 on the bottom of the manifold plate 142. This vacuum, or negative relative pressure, tends to deform the belt 104 in the region of the recessed portions 144, such that portions of the belt 104 are withdrawn away from the working surface 160 towards the recessed portions 144, as shown in FIG. 7(b). Accordingly, gaps 162 are provided between the outer surface of the traction belt 104 and the working surface 160. Furthermore, because of the openings 148 through the belt 104 the reduced pressure or vacuum is applied through the belt 104 directly to the surface 160 in the area of the recessed portions 144. Accordingly, the surface clinging tool 150 is drawn against the working surface 160 by the relative pressure difference between the area outside the manifold plate and the area between the recessed portions 144 and the working surface 160. The amount of clinging force provided is a function of the strength of the vacuum, and the surface area encompassed by the recessed portions 144 of the manifold plate 142.

The surface clinging tool 150 may be moved across an inclined or downward facing surface 160 by a user providing a pushing or pulling force at handle 152. The clinging force provided between the surface clinging tool 150 and the working surface 160 will take some, or all, of the weight of the surface clinging tool 150 and the tool 156 making it easier for a user to maneuver the tool 156 on the working surface 160. By properly adjusting the tool 156 on the tool mounting bars 154 it can be assured that the tool 156 will remain at a constant distance and orientation relative to the working surface 160. Alternatively, if the traction device 100 is provided with a motor, the motor may be activated to move the belt 104 around the rollers 102 and 103, and thereby cause the tool 150 to move across the working surface 160.

Figure 8:
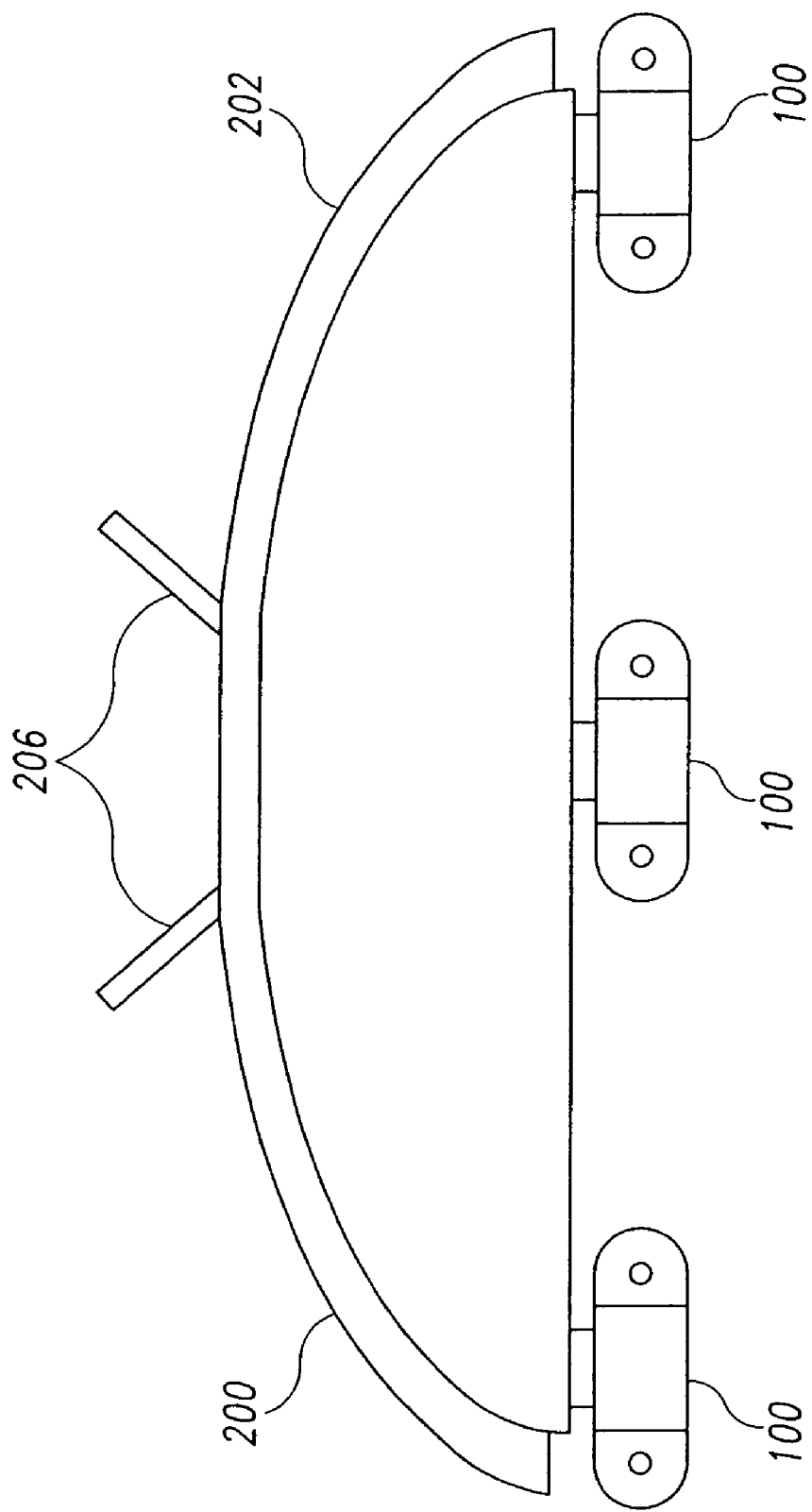
FIG. 8 is an isometric view of a robot according to one embodiment of the present invention.

FIG. 8 shows a robot 200 according to one embodiment of the present invention that utilizes traction devices 100 similar to those described above. The robot 200 includes a chassis 202 suspended on a plurality of traction devices 100. Each of the traction devices 100 is mounted for independent swiveling movement relative to the chassis 202. The robot 200 acts as a surface clinging device that can carry a payload within its chassis 202. The payload may include a tool 156 for working on a working surface 160. As discussed above, the tool 156 may be a sander, grinder, paint sprayer, camera, sensor, or any other tool that needs to be provided in close working relation to a working surface 160. Additionally, the payload within the chassis 202 may include a steering mechanism for swiveling adjusting the traction devices 100 relative to the chassis 202, a central vacuum supply for supplying vacuum to the individual traction devices 100, a power supply for supplying power to the drive mechanisms for the traction devices 100, and an umbilical cord 204 for connecting the robot 200 with other robots or with a control mechanism and/or power supply. Access to the payload within the chassis 202 may be provided by closeable doors 206.

The robot 200 is well suited for use on a wide variety of structures that include inclined and downward facing surfaces that require maintenance for inspection. For example, robot 200 may be used in the inspection and/or maintenance of water towers, submarines, ships, storage silos and storage tanks, tall buildings and windows on buildings, or cooling towers for nuclear power plants.

Figure 9:
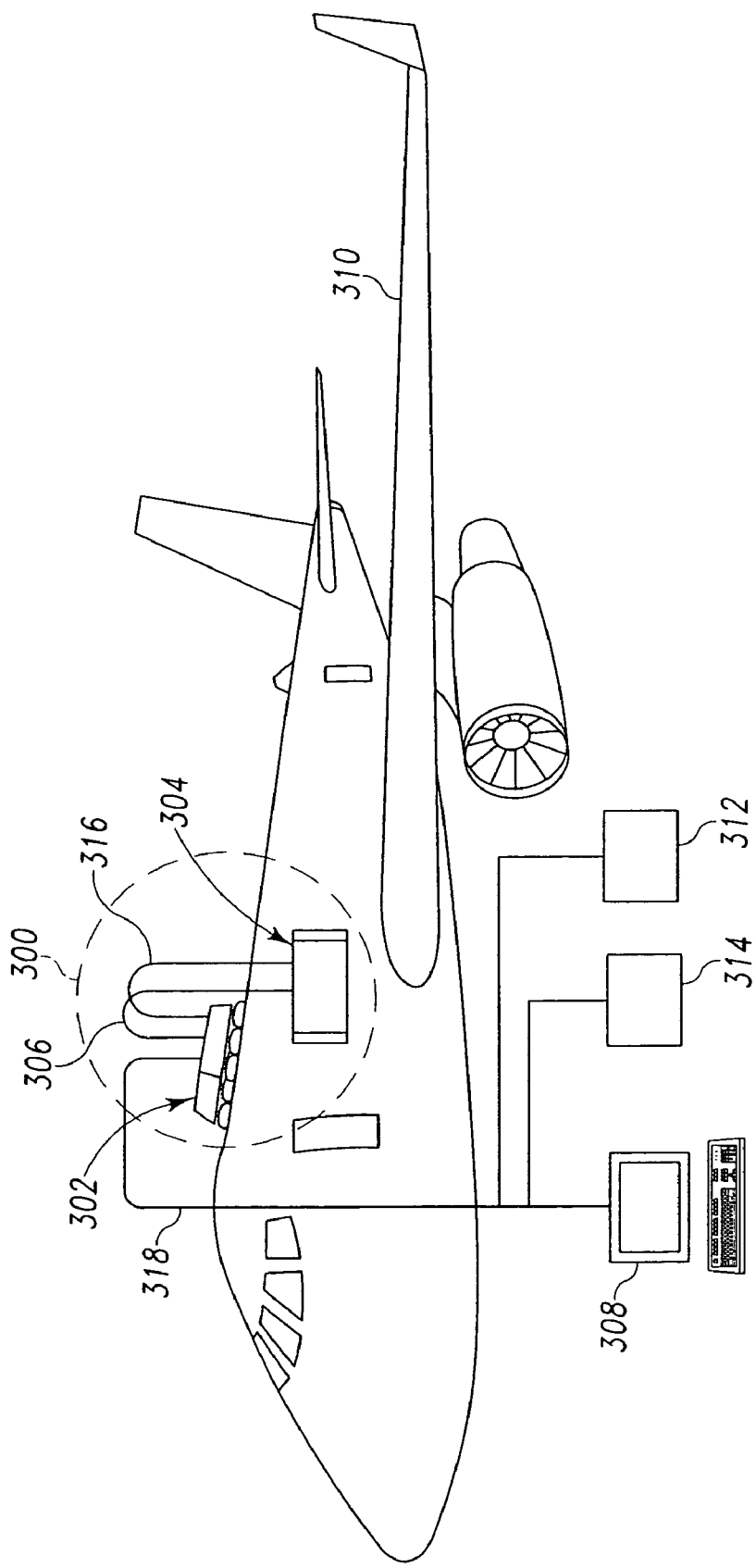
FIG. 9 is an isometric view of a system for performing maintenance on an aircraft utilizing robots similar to that shown in FIG. 8.
Figure 10:
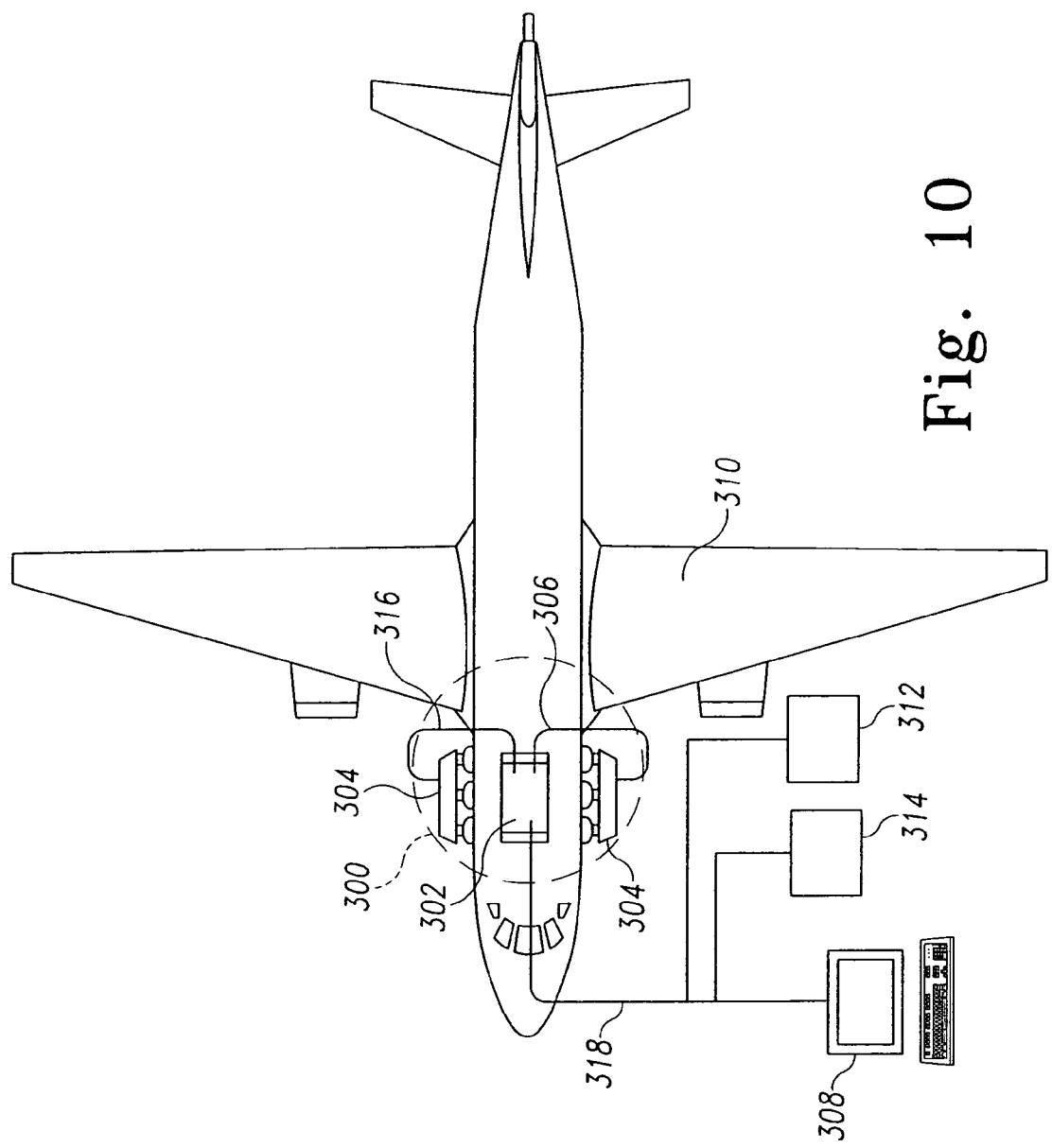
FIG. 10 is a top plan view of the system and airplane from FIG. 9.

FIGS. 9 & 10 show a system for performing maintenance on an existing structure utilizing robots similar to that shown in FIG. 8. According to the embodiments of FIGS. 9 & 10, the structure being maintained is an aircraft. As noted above, while the system described is particularly well suited for aircraft maintenance, it will have uses in association with other structures. The system 300 includes a support robot 302 that is intended to be located at a high location on the structure 310, preferably at a portion of the structure 310 that is generally horizontal. For example, as shown in FIGS. 9 & 10 the support robot 302 may be located at the top of an aircraft fuselage.

Payload robots 304 may be attached to the support robot 302 by a tension element, such as an umbilical 306 or a tension cord 316. Each umbilical 306 may include a data cable or cables for transmitting information back and forth between the support robot 302 and the payload robot 304. Additionally, the umbilicals 306 may include a power supply line and a vacuum supply line to provide electrical power and a vacuum source to the payload robot 304. Preferably, the umbilicals 306 will be self-tensioning retractable lines that will provide support to the payload robots 304 in addition to the support provided by the traction devices 100 on the payload robots 304. Therefore, the traction devices 100 would not be required to support the full weight of their respective robots. Furthermore, if there should be failure of the traction devices 100 on the payload robots 304, the umbilical 306 may permit the support robot 302 to support the entire weight of the payload robot 304. In addition to the umbilical 306, a tension cord 316 may also be provided between the support robot 302 and each payload robot 304. This tension cord 316 would provide additional support to payload robot 304, thereby supplementing or eliminating the umbilical 306.

The support robot 302 may be configured to fit the leading surfaces of a vertical stabilizer in order to climb to the highest portion of the aircraft. Alternatively, a smaller support robot (not shown) may be deployed from the primary support robot 302 at the base of the vertical stabilizer to climb the vertical stabilizer. The smaller support robot would be provided with a tensioned cord or cords to support at least part of the weight of payload robots 304 doing work on the vertical sides of the vertical stabilizer.

The payload robot 304 may be similar to the robot 200 shown in FIG. 8. The payload robot 304 will have mounted in its chassis 202 a tool for use on the fuselage of the aircraft 310, or other structure being worked upon or inspected.

A supply cable 318 may be provided between the support robot 302 and a control mechanism 308, a power supply 312 and a vacuum source 314. The control mechanism 308 may include a CPU and keyboard. The CPU may be programmed with software that permits it to provide control signals to the support robot 302 and the payload robot 304 through data cables included in the supply cable 318. Alternatively, radio frequency or infrared signals may be used between the control mechanism 308 and the robots 302 and 304. Alternatively, the control mechanism 308 may provide a control signal only to the support robot 302 which in turn provide control signals to the payload robot 304. The power supply 312 may be a standard electrical outlet having a voltage of 110 volts or 220 volts, or may be a direct voltage, as provided by a battery. The vacuum source 314 should be connected to the support robot 302 and the payload robots 304 by pneumatic hoses. Alternatively, each robot 302 and 304 may be provided with its own internal vacuum source.

Each robot 302 and 304 may be maneuvered around on the surface of the aircraft 310 or other structure, by manipulation of the individual traction devices 100. As discussed above, each individual traction device 100 should be swively mounted to the chassis 202 of the robot 302 or 304. By coordinating the alignment of the traction devices 100, and the relative movement of the traction belts 104 on the individual traction devices 100, the robots 302 and 304 can be moved across the surface of the aircraft 310 to any desired location. Typically, when turning one of the traction devices 100 relative to the chassis 202 and the working surface 160 it is desirable to de-energize the vacuum supply to the recessed portions 144 so that the traction device 100 does not cling to the working surface 160 as it is being turned. For this reason, it may be desirable to turn the traction devices 100 one at a time so that while one traction device 100 is being turned the clinging force of the other traction devices 100 holds the robots 302 and 304 in place firmly against the working surface 160. Because there may be some residual suction cup effect if the vacuum supply is simply cut off, it may be desirable to include a mechanism to selectively provide positive pressure to the recessed portions 144 in order to fully release a traction device 100 from a working surface 160 before and during turning of the traction device so as to alleviate scrubbing on the surface 100.

In operation the system 300 would be deployed on the aircraft 310 by manually, or with the aid of mechanical help, placing the support robot 302 and payload robot 304 against the fuselage of the aircraft 310 at an easily accessed portion of the fuselage. The vacuum source 314 can then be activated to cause the traction devices 100 on the robots 302 and 304 to cling to the fuselage of the aircraft 310. The control mechanism 308 can be activated to cause the robots 302 and 304 to move up the fuselage until the support robot 302 is located in a desired high position on the fuselage. The payload robot 304 may then be given a control signal to move down the side of the fuselage of the aircraft 310 into a working position as shown in FIGS. 9 & 10. The payload robot 304 may then be given signals by the control mechanism 308 causing the payload robots 304 to move across the fuselage in a desired manner such that an attached tool 156 is moved across the surface of the aircraft 310 in a desired fashion. Alternatively, the support robot 302 may be deployed and maneuvered to the desired support position prior to attaching the payload robots 304 to the tension umbilical or cord.

According to one embodiment of the invention the support robot 302 may be located at a set location on the top of the aircraft fuselage 310, and further the support robot 302 may be provided with software that permits it to sense the location of the payload robot 304 relative to that desired location. Furthermore, the support robot 302 may be provided with software that permits it to control movement of the payload robots 304 relative to the support robot 302 in order to move the payload robot 304 across the fuselage of the aircraft 310 in a desired manner.

Figure 11:
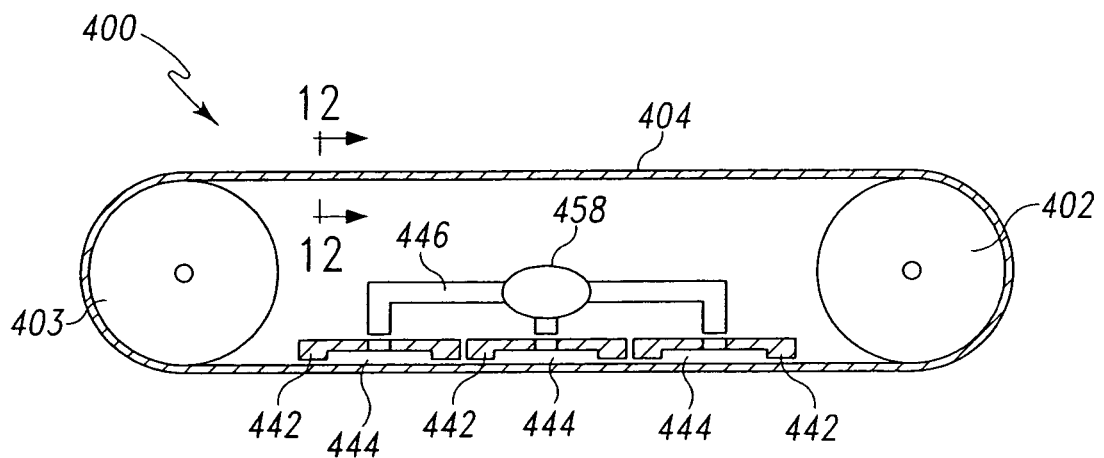
FIG. 11 is a cross sectional view of a traction device according to another embodiment of the present invention.
Figure 12:
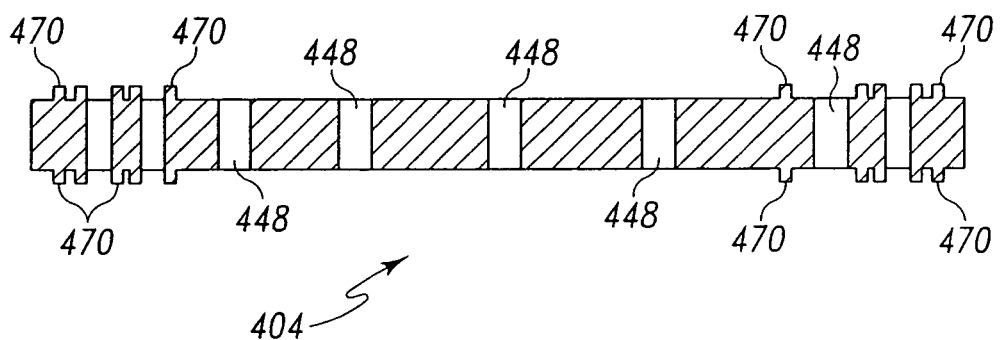
FIG. 12 is a cross section view of the a belt from the traction device of FIG. 11, taken along line 12-12 of FIG. 11.

FIGS. 11 and 12 show a traction device 400 according to another embodiment of the present invention. FIG. 11 is a cross-section view showing a belt 404 around rollers 402 and 403. Rather than a single manifold plate, the device 400 utilizes four articulated manifold plates 442, each with a recessed portion 444 through which a vacuum is applied to the belt 404. The embodiment of FIG. 11 shows a positive pressure source 458 within the traction device 400. This positive pressure source 458 provides positive pressure above the manifold plates 442, which creates a venturi effect, to cause a vacuum on the recessed portion 444 side of the plate 442. In practice, it may be preferable to use a remote positive pressure source that utilizes a flexible pneumatic hose to attach to the elbows 446 that connect terminate just above the back side of the manifold plates 442.

As seen in FIG. 12, the belt 404 may include flexible ridges 470 near the edges of the belt 404. Openings 448 are provided between the ridges 470, as well as throughout the belt 404 in order to permit the vacuum to be applied through the belt 404. These ridges 470 help the belt 404 to maintain a high friction coefficient to surfaces even when the surfaces have discontinuities such as seams, rivet heads, bolts, and the like.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

We claim:

1. A traction device comprising:
    a frame;
    a pair of rollers mounted on the frame;
    a belt continuously looped around the rollers such that a traction portion is formed between the rollers, the belt including an inner surface facing the rollers and an outer surface opposite from the inner surface; the belt being provided with a plurality of apertures extending through the belt from the inner surface to the outer surface; and
    a vacuum source operably connected to the frame for supplying a vacuum to the inner surface of the traction portion such that vacuum is also provided through the plurality of apertures to the outer surface to cause the traction device to tend to cling to a surface in contact with the outer surface of the traction portion.

2. The traction device according to claim 1, further comprising a manifold mounted to the frame in close proximity to the inner surface of the traction portion of the belt; the manifold being connected to the vacuum source.

3. The traction device according to claim 2, wherein the manifold includes a generally flat plate portion facing and adjacent to the inner surface of the traction portion of the belt, wherein the plate portion includes a plurality of recessed portions that are recessed away from the inner surface of the belt, and wherein the vacuum source provides the vacuum to the inner surface of the traction portion at the recessed portions.

4. The traction device according to claim 3, further comprising a mechanism for supplying positive pressure through the manifold.

5. The traction device according to claim 1, wherein a motor is mounted to the frame for driving one of the rollers to thereby drive the belt in a continuous loop.

6. The traction device according to claim 1, further comprising a tool mount for mounting a tool to the frame.

7. A surface clinging device comprising a plurality of traction devices according to claim 1.

8. The surface clinging device of claim 7 further comprising a tool mount for mounting a tool and a handle for maneuvering the surface clinging device.

\* \* \* \* \*